US012334321B1

(12) United States Patent
Pantha

(10) Patent No.: US 12,334,321 B1
(45) Date of Patent: Jun. 17, 2025

(54) AND MANUFACTURING METHODS OF SWIR I2TUBE VIA HETEROGENEOUS WAFER INTEGRATION

(71) Applicant: L3Harris Technologies, Inc., Melbourne, FL (US)

(72) Inventor: Bed Pantha, Chandler, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 18/796,351

(22) Filed: Aug. 7, 2024

(51) Int. Cl.
*H01J 40/06* (2006.01)
*G02B 23/12* (2006.01)
*H01J 1/34* (2006.01)
*H01J 9/12* (2006.01)
*H01J 9/20* (2006.01)

(52) U.S. Cl.
CPC .............. *H01J 40/06* (2013.01); *G02B 23/12* (2013.01); *H01J 1/34* (2013.01); *H01J 9/12* (2013.01); *H01J 9/205* (2013.01); *H01J 2201/3423* (2013.01)

(58) Field of Classification Search
CPC ...... H01J 9/12; H01J 9/205; H01J 1/34; H01J 40/06; G02B 23/12
USPC ......................................................... 313/542
See application file for complete search history.

(56) References Cited

U.S. PATENT DOCUMENTS

| | | | |
|---|---|---|---|
| 5,268,570 A | 12/1993 | Kim | |
| 5,378,640 A | 1/1995 | Kim | |
| 5,506,402 A | 4/1996 | Estrera et al. | |
| 5,610,078 A | 3/1997 | Estrera et al. | |
| 6,005,257 A | 12/1999 | Estrera et al. | |
| 7,092,013 B2 | 8/2006 | Bacarella et al. | |
| 7,706,062 B2 | 4/2010 | Ramboyong et al. | |
| 10,186,405 B2 | 1/2019 | Conde et al. | |
| 10,734,184 B1* | 8/2020 | Smith .................... | H01J 31/505 |
| 10,763,092 B2 | 9/2020 | Burnsed et al. | |
| 2005/0017313 A1* | 1/2005 | Wan ......................... | H01G 5/40 |
| | | | 257/E29.323 |

FOREIGN PATENT DOCUMENTS

JP   2024532837 A  *  9/2024

OTHER PUBLICATIONS

Escher, J.S. et al., 1.06—Micron III-V Photocathode Development, Technical Report AFAL-TR-78-78, May 1978, Air Force Avionics Laboratory, 122 pp.

Escher, J.S. et al., Photoelectric Imaging in the 0.9-1.6 Micron Range, IEEE Electron Device Letters, vol. EDL-2, No. 5, May 1981, pp. 123-125.

(Continued)

*Primary Examiner* — Christopher M Raabe
(74) *Attorney, Agent, or Firm* — NIXON & VANDERHYE P.C.

(57) ABSTRACT

A photocathode is formed with a first absorber assembly on a first substrate for a first spectral band and a second absorber assembled on a second substrate for a second spectral band. The second substrate is different from the first substrate, and the second spectral band is different from the first spectral band. The first absorber and the second absorber can be joined using a direct semiconductor wafer bonding process. The integration of a second absorber such as an SWIR absorber layer can extend the spectral response of image intensifier tubes.

19 Claims, 6 Drawing Sheets

(56) References Cited

OTHER PUBLICATIONS

Cheng, Hongchang et al., Photoemission Performance of Transmission-Mode GaAlAs/InGaAs Photocathode, Optoelectronics and Advanced Materials—Rapid Communications, vol. 6, No. 9-10, Sep.-Oct. 2012, pp. 788-792.

* cited by examiner

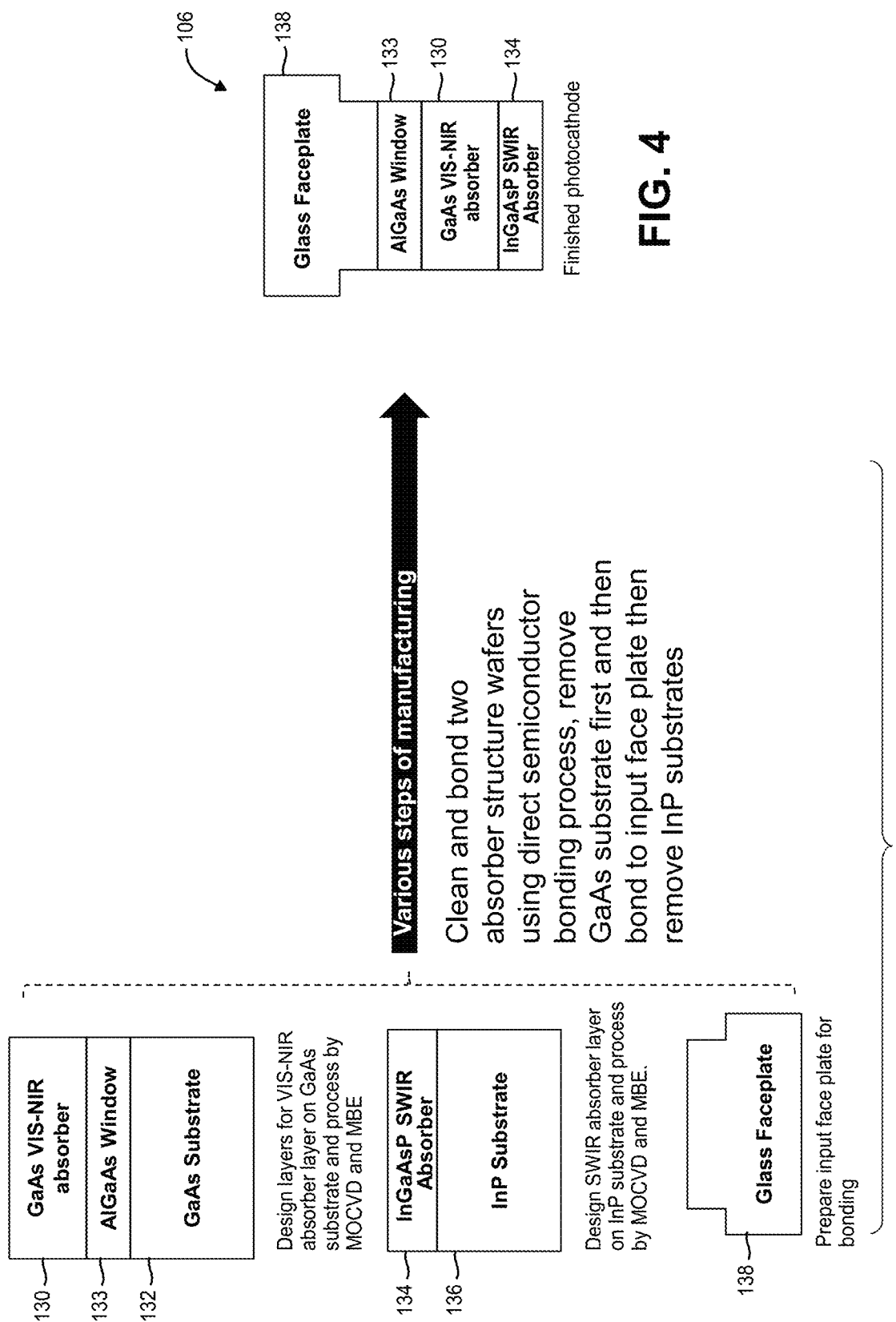

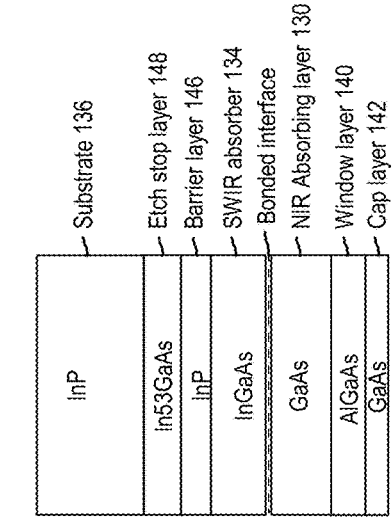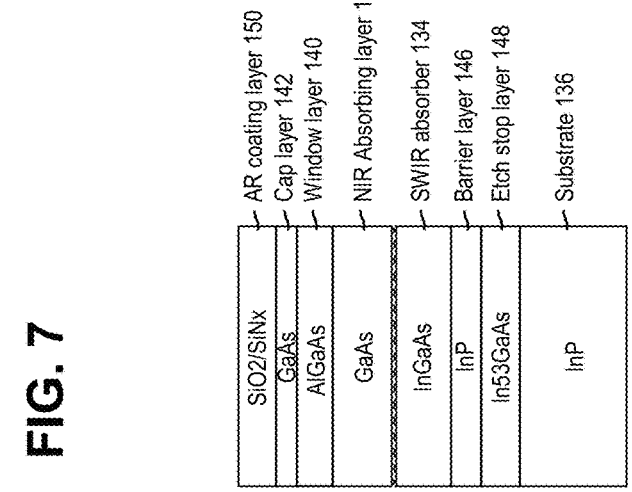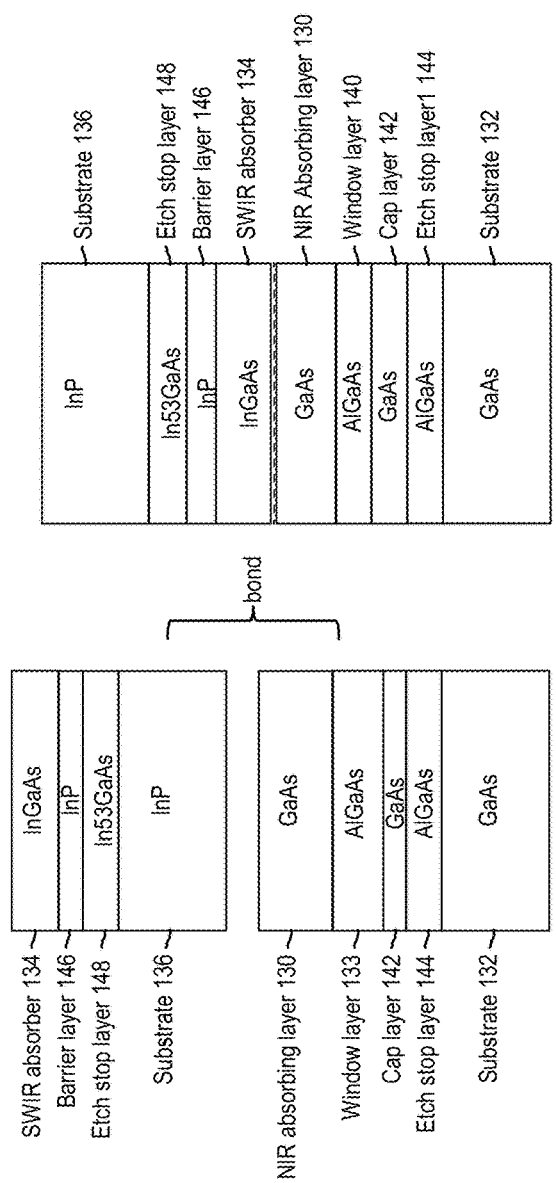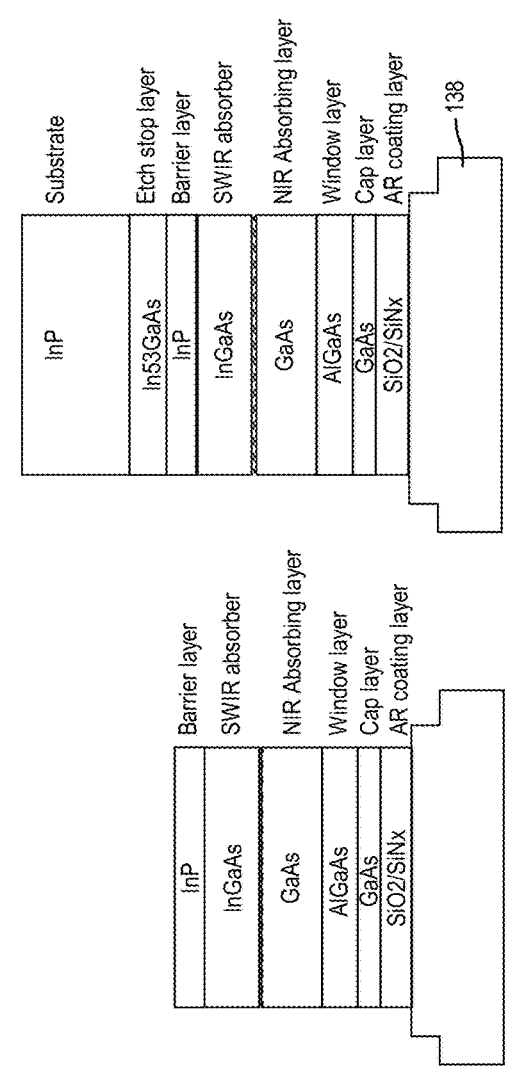
FIG. 5
FIG. 6
FIG. 7
FIG. 8
FIG. 9
FIG. 10

AND MANUFACTURING METHODS OF SWIR I2TUBE VIA HETEROGENEOUS WAFER INTEGRATION

BACKGROUND

Nightvision systems allow a user to see in low-light environments without external human visible illumination. This allows for covert vision in a low-light environment to prevent flooding the environment with human visible light. Some nightvision systems function by receiving low levels of light reflected off of or emitted from objects and providing that light to an image intensifier (sometimes referred to as $I^2$). The image intensifier has a photocathode. When photons strike the photocathode, electrons are emitted into a vacuum tube and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Proliferation of nightvision devices, both digital an image intensified, allows near-peer threats to see legacy 0.85 μm Near Infrared (NIR) aiming and illumination lasers, reducing capability for covert operation and deteriorating overmatch. Use of the Short-Wave Infrared (SWIR) offers potential for restoration of covert operations, but existing SWIR cameras are still prohibitively expensive for dismount soldier mobility and situational awareness systems.

The spectral sensitivity of state-of-the-art Gen III Image Intensifier Tubes (I2Tubes) has cutoff at around 0.91 μm as fundamentally dictated by the band gap of the GaAs absorber used within the photocathode. This is a major limiter for detection of "out-of-band" military lasers, including 1.0641 μm sources used for weapons designation and 1.551 μm sources used for range finding and SWIR target marking.

The spectral response of the I2Tube can be expanded by replacing or modifying the current GaAs absorber through integration of a SWIR absorber into the existing photocathode. However, a high-quality SWIR absorber cannot be epitaxially grown on a GaAs substrate due to the large lattice mismatch between layer and substrate. Moreover, in the realm of epitaxial processes, it is challenging to monolithically stack layers composed of atoms with differing sizes or mechanical characteristics. Such epitaxial process leads to formation of defects as strain arising from two different sized atoms relax to equilibrium state.

The subject matter claimed herein is not limited to embodiments that solve any disadvantages or that operate only in environments such as those described above. Rather, this Background is only provided to illustrate one exemplary technology area where some embodiments described herein may be practiced.

SUMMARY

A high-quality SWIR absorber layer such as lattice-matched InGaAs can be grown on InP substrates. This SWIR absorber layer can then be joined to the conventional GaAs layer with an NIR absorber layer using advanced wafer bonding techniques, resulting in heterogenous integration of photocathode wafers grown on different semiconductor substrates. Recent progress in wafer bonding techniques has paved the way for exciting developments, especially in the area of direct semiconductor wafer bonding (DSWB). This method eliminates the need for an intermediary layer while achieving an atomically smooth interface. Heterogeneous bonding stands out as particularly beneficial for device designs that require atoms of varying sizes to be stacked directly upon one another.

In an exemplary embodiment, a method of forming a photocathode includes the steps of (a) assembling a first absorber on a first substrate for a first spectral band; (b) assembling a second absorber on a second substrate for a second spectral band, wherein the second substrate is different from the first substrate, and wherein the second spectral band is different from the first spectral band; and (c) joining the first absorber and the second absorber using a direct semiconductor wafer bonding process.

Step (a) may be practiced such that the first spectral band includes a near infrared (NIR) wavelength, and step (b) may be practiced such that the second spectral band includes a short-wave infrared (SWIR) wavelength. The first substrate may include a GaAs substrate, where step (a) may include forming a window layer on the first substrate and forming an NIR absorber layer on the window layer. The second substrate may include an InP substrate, where step (b) may include forming an SWIR absorber layer on the second substrate. The method may also include tuning the second spectral band by engineering the bandgap of the SWIR absorber layer.

Step (a) may include, prior to step (c), forming a first etch stop layer on the first substrate, forming a cap layer on the first etch stop layer, forming a window layer on the cap layer, and forming an NIR absorber layer on the window layer. Step (b) may include, prior to step (c), forming a second etch stop layer on the second substrate, forming a barrier layer on the second etch stop layer, and forming an SWIR absorber layer on the barrier layer. In this context, the method may further include, after step (c), removing the first substrate and removing the first etch stop layer, thereby exposing the cap layer. The method may still further include, after the removing steps, forming an anti-reflective (AR) coating layer on the cap layer. After forming the AR coating layer, the method may include bonding an input faceplate on the AR coating layer. After bonding the input faceplate, the method may include removing the second substrate and the second etch stop layer.

In some embodiments, steps (a) and (b) are practiced such that the SWIR absorber layer may be thinner than the NIR absorber layer.

The method may further include, after step (c), removing the first substrate to define an interim construction, bonding the interim construction to an input face plate, and subsequently removing the second substrate.

In another exemplary embodiment, a method of forming a photocathode includes the steps of growing a first photocathode wafer on a GaAs substrate, the first photocathode wafer initially including a near infrared (NIR) absorber layer along with a first etch stop layer and a window layer; growing a second photocathode wafer on an InP substrate, the second photocathode wafer initially including a short-wave infrared (SWIR) absorber layer along with a second etch stop layer and a second barrier layer; integrating the first and second photocathode wafers via a direct semiconductor wafer bonding process; removing the first and second etch stop layers; and bonding an input faceplate to the integrated first and second photocathode wafers.

In yet another exemplary embodiment, a photocathode is formed according to the method of the described embodiments. A range of a SWIR spectral response may be in the range of 1.25-2.1 μm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the described invention may be realized and obtained by means of the instruments and combinations particularly pointed out in the appended claims. Features of the described embodiments will become more fully apparent from the following description and appended claims or may be learned by the practice of the described embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIGS. 3 and 4 show components of the finished photocathode;

FIGS. 5-10 show exemplary design and manufacturing concepts for the photocathode;

DETAILED DESCRIPTION

Embodiments described and illustrated herein implement a photocathode with a first absorber, for example an NIR absorber, grown on a GaAs or other compatible substrate, and a second absorber, for example an SWIR absorber, grown on an InP or other compatible substrate, with the first and second absorbers bonded using a direct semiconductor wafer bonding process.

The direct semiconductor to semiconductor wafer bonding process is a known technique used to join two semiconductor wafers without using any intermediate adhesive or bonding layer. The process relies on physical and chemical interactions between the wafer surfaces to achieve a strong bond. By way of example, the surfaces of the wafers are first cleaned thoroughly to remove contaminants and native oxides. In some cases, chemical mechanical polishing process is essential to reduce the surface roughness and remove foreign particulates or debris. The surface roughness is reduced to the nanometer scale to facilitate close contact between the wafers. The two wafers are aligned with high precision and brought into contact at elevated temperature and under high pressure and vacuum. Atoms at the interface will diffuse between the two semiconductor wafers. To increase the bond strength, in some cases, the bonded wafers may undergo a thermal annealing process. During annealing, chemical bonds (such as covalent bonds) form at the interface, significantly increasing the bond strength. The technique enables the creation of complex device structures with high precision and reliability. It also allows for the combination of different materials and the fabrication of devices with improved performance characteristics.

Figure 1:
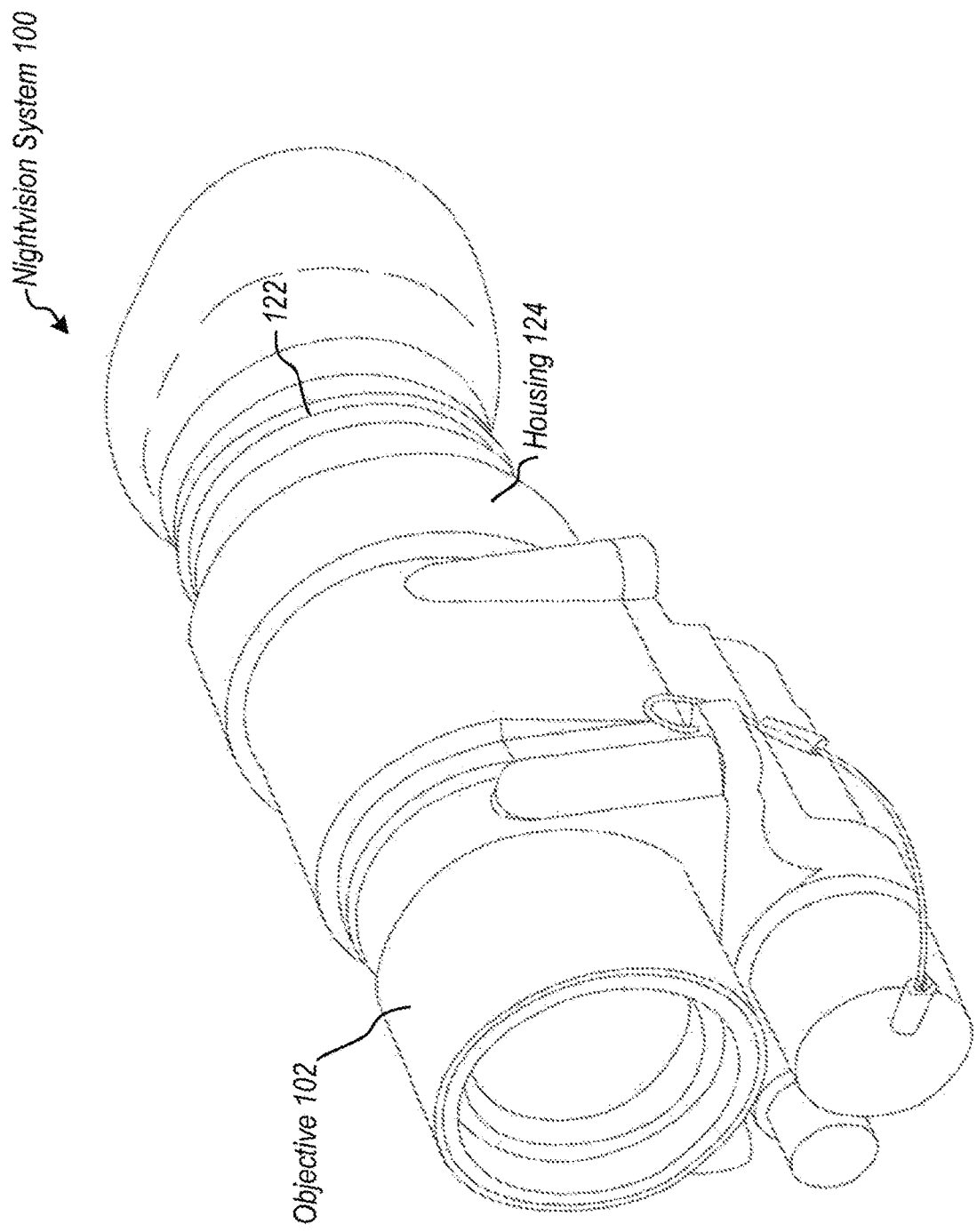
FIG. 1 illustrates an exemplary nightvision system.

Previously, a GaInAs absorber of a photocathode on a GaAs substrate is limited in wavelength sensitivity range due to significant performance reduction as the range extends much beyond 900 nm. However, including photocathodes as described and illustrated herein achieves functionality with longer wavelengths FIG. 1 shows a specific example of a nightvision system. FIG. 1 illustrates the PVS-14 nightvision system 100. In the example illustrated, the nightvision system 100 includes a housing 124. As will be illustrated in more detail below in other figures, the housing 124 houses an image intensifier and various other components. The nightvision system 100 further includes an objective 102 which receives weak light reflected and/or generated in an environment. The objective 102 includes optics such as lenses, waveguides, and/or other optical components for receiving and transmitting light to an image intensifier. The nightvision system 100 further includes an eyepiece 122. The eyepiece 122 includes optics for directing images created by the nightvision system 100, including images created by the image intensifier and images created by a transparent optical device, into the eye of the user.

Figure 2:
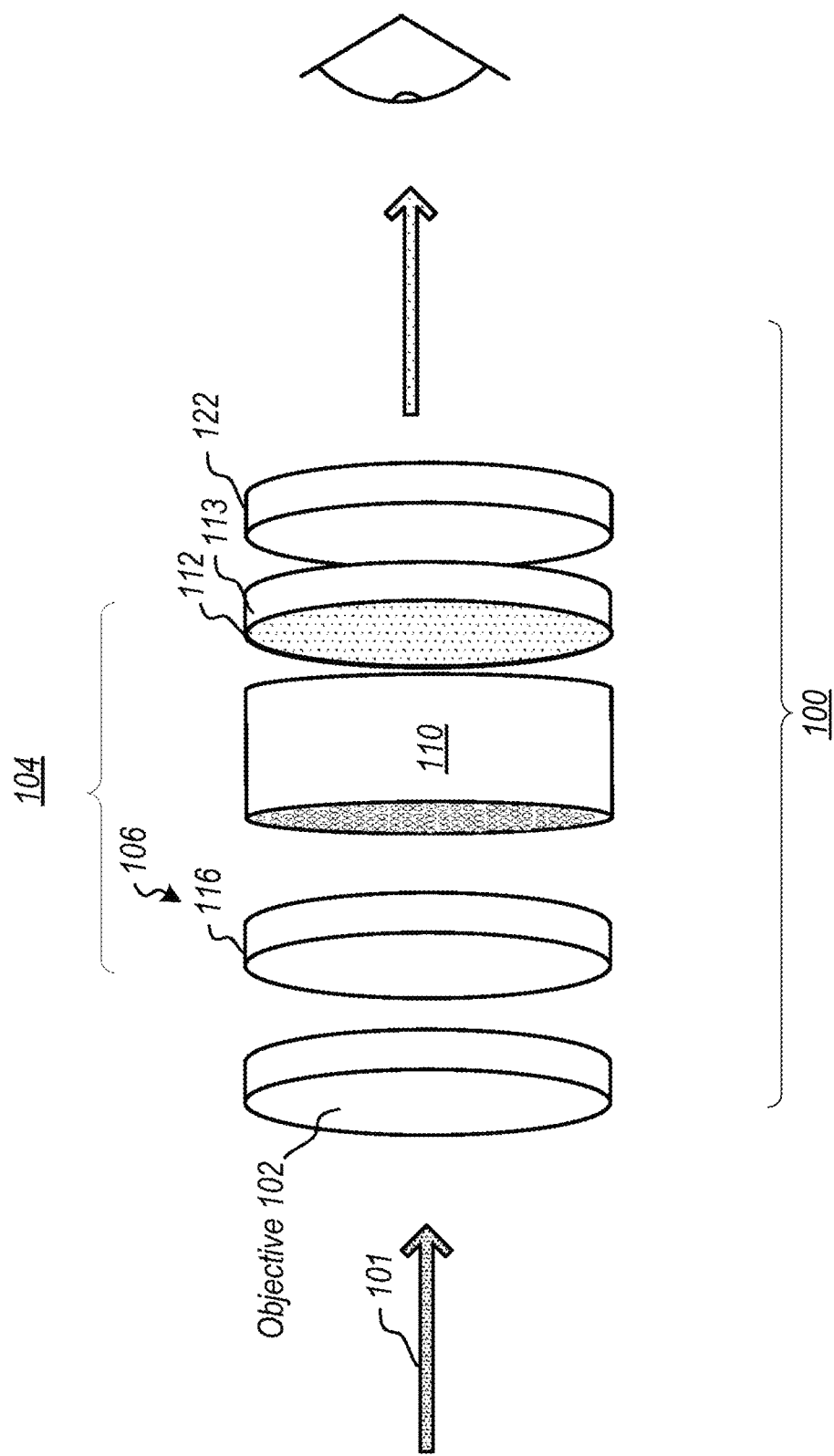
FIG. 2 illustrates a block diagram of portions of the nightvision system.

FIG. 2 illustrates a block diagram of one embodiment of the invention. A nightvision system typically includes the objective 102 to focus input light 101 into the image intensifier 104. Input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not viewable in the viewable spectrum for human observers. For example, in some embodiments, laser guidance and painting systems may direct laser light at objects for designation and/or targeting. A third source of light may be light emitted by an object itself. For example, this may be related to visible light, infrared heat energy emitted by the object and directed into the objective, etc. Nonetheless, the nightvision system is able to convert the light emitted from the source into a viewable image for the user.

The objective directs input light 101 into the image intensifier 104. Note that the image intensifier 104 may include functionality for amplifying light received from the objective to create a sufficiently strong image that can be viewed by the user. This may be accomplished using various technologies. In the example of FIG. 2, a photocathode 106, a microchannel plate 110, and a phosphor screen 112 are used. The space between the absorber 116 and the phosphor screen, including the microchannel plate 110, includes a vacuum. The photocathode 106 generates photo electrons in response to incoming photons. Electrons from the photocathode 106 are emitted into the microchannel plate 110. Electrons are multiplied in the microchannel plate 110.

Electrons are emitted from the microchannel plate 110 to a phosphor screen 112 which glows as a result of electrons striking the phosphor screen 112. This creates a monochrome image from the input light 101.

A fiber-optic 113 carries this image as intensified light to the eyepiece (such as eyepiece 122 illustrated in FIG. 1) of a nightvision system where it can be output to the user. This fiber-optic 113 can be twisted 180 degrees to undo the inversion caused by the system objective to allow for convenient direct viewing of the phosphor screen 112.

Embodiments may be implemented with a re-designed photocathode such as, for example, photocathode 106 illustrated in FIG. 4. A re-designed photocathode may be manufactured to be sensitive to a broader spectrum of light as compared to previous designs.

With reference to FIG. 3, an NIR absorber or NIR absorber layer 130 is assembled on a first substrate 132, such as a GaAs substrate, via metal-organic chemical vapor deposition (MOCVD) and molecular beam epitaxy (MBE) as is conventional. The NIR absorber 130 is sensitive to a first spectral band in near-infrared wavelengths. A second absorber or absorber layer 134, sensitive to a second spectral band, may be assembled on a second substrate 136, different from the first substrate 132. For example, the second absorber 134 may be an InGaAsP SWIR absorber formed on an InP substrate 136. The second absorber 134 may be similarly assembled via MOCVD and MBE.

The SWIR absorber 134 is sensitive to wavelengths in the short-wave infrared range and can be a thin lattice-matched InGaAsP (or InGaAs) bulk layer, InGaAsP/InGaAs MQWs (multiple quantum wells), InGaAs MQDs (multiple quantum dots) deposited on the InP substrate 136. Other known processes and materials can be used for the SWIR absorber 134.

Lattice match InGaAsP bulk absorber layer limits the upper end of SWIR response to 1.7 μm, while strained or strained balanced or partially strained MQWs or MQDs absorber may allow to design cathode to response to 2.1 μm. MQWs consist of repeated layers of higher and lower band gap semiconductor layers, called barrier and well respectively. Thickness of the InGaAsP bulk absorber layer may be varied from 25 nm to approximately 50 nm, 100 nm or 500 nm. MQW's barriers may be latticed matched or tensile strained InGaAsP layers, while InGaAsP well layer may be lattice matched or compressively strained layers.

Barrier thickness may be varied from approximately 2 nm to 4 nm up to approximately 8 nm to 10 nm. Strained well thickness may be kept below critical thickness, which is the function of the composition of InGaAsP material. In some embodiments, the number of quantum wells can be varied from a single quantum well to ten quantum wells. SWIR absorber layers are undoped or partly doped or may be lightly doped by p-type elements such as Zn or Be or C or Mg (less than 1e-16 cm$^{-3}$). The SWIR absorber layer may be placed a few nanometers inside the second barrier layer (InP).

Barrier thickness may be varied from 2 nm to 100 nm down from the surface of the finished photocathode. The barrier layer may be undoped at the vicinity of the SWIR absorber layer but highly doped by p-type elements otherwise. Alternative technologies may include light-emitting diodes (LEDs), laser diodes (LDs), solar cells, and photocathodes, typically MQWs or MQDs layers positioned between the p-type and n-type layers or at the depletion region of the P-N junction. However, for heterogeneously integrated SWIR photocathodes, the MQWs or MQDs layers are predominantly asymmetric, with a tendency to be oriented towards the vacuum side of the p-type NIR absorber layer or positioned within the band bending region.

As shown in FIG. 3, a window layer 133, such as an AlGaAs window layer, may be interposed between the first absorber 130 and the first substrate 132. Conventionally, the window layer 133 enhances device performance and efficiency. By using an AlGaAs window layer, the photocathode can be designed to better absorb photons in the active region where electron-hole pairs are generated, which improves the overall quantum efficiency of the device. Additionally, the window layer has a wider bandgap compared to the substrate and acts as a barrier to protect the underlying layers from contamination and damage during fabrication and use. Additionally, by varying the composition of materials, optical properties such as bandgap and refractive index can be tuned to optimize photocathode response for specific wavelengths.

The first and second absorbers 130, 134 are subsequently joined using the direct semiconductor wafer bonding process. As discussed in more detail below, the finished photocathode shown in FIG. 4 is a product of the direct semiconductor wafer bonding process, after which the first substrate 132 is removed and a glass faceplate 138 is bonded to the assembly, after which the second substrate 136 is removed.

FIGS. 5-10 illustrate the assembly process for the photocathode 106 of the described embodiments. FIG. 5 shows the separated first absorber 130 on the first substrate 132 and second absorber 134 on the second substrate 136. In addition to the absorber layer 130, the first structure includes the window layer 133 (e.g., AlGaAs), a cap layer 142 (e.g., GaAs), and an etch stop layer 144 (e.g., AlGaAs).

The structure supporting the second absorber layer 134 includes a barrier layer 146 (e.g., InP) and an etch stop layer 148 (e.g., In53GaAs). For reference, the substrates 132, 136, which are ultimately removed, typically are considerably thicker than the non-substrate layers, e.g., about 500× thicker. The materials and layers used to derive the absorber structures may be subsequently removed via known processes, and the etch stop layers 144, 148 facilitate etch removal of specific layers without affecting other layers of the structures.

FIG. 6 shows the structure after heterogeneous bonding via the direct semiconductor wafer bonding process. The thin epitaxial thickness design maintains the surface roughness of wafers during epitaxial process required for direct semiconductor bonding. Additionally, the perfect lattice-matched design of the epitaxial layers introduces no warp on the wafers, which allows uniform temperatures for successful bonding.

The InP barrier layer 146 may be added as the first layer to the semiconductor vacuum interface. The thickness of the InP barrier layer 146 will be maintained thin enough to keep the conduction band below the vacuum level of InP while electrons from the InGaAs SWIR absorber layer 134 tunnel through. The InP barrier 146 will suppress background noise (e.g., equivalent background illumination (EBI)). Additionally, the InP barrier 146 will prevent desorption of the SWIR absorber layer 134 during bonding. InP barrier thickness may be varied from 2 nm to 100 nm from the surface of the finished photocathode.

In FIG. 7, the first substrate 132 and subsequently the etch stop layer 144 have been removed by known selective wet etch chemistries, thereby exposing the cap layer 142. In FIG. 8, the structure is inverted, and an anti-reflective (AR) coating layer 150 is applied on the cap layer 142. An exemplary AR coating layer 150 is $SiO_2/SiN_x$. In FIG. 9, the structure is inverted once again, and the glass faceplate 138 is bonded to the structure over the AR coating layer 150 using known techniques and materials.

In FIG. 10, the second substrate and the second etch stop layer 148 are removed by known selective wet etch chemistries.

Figure 11:
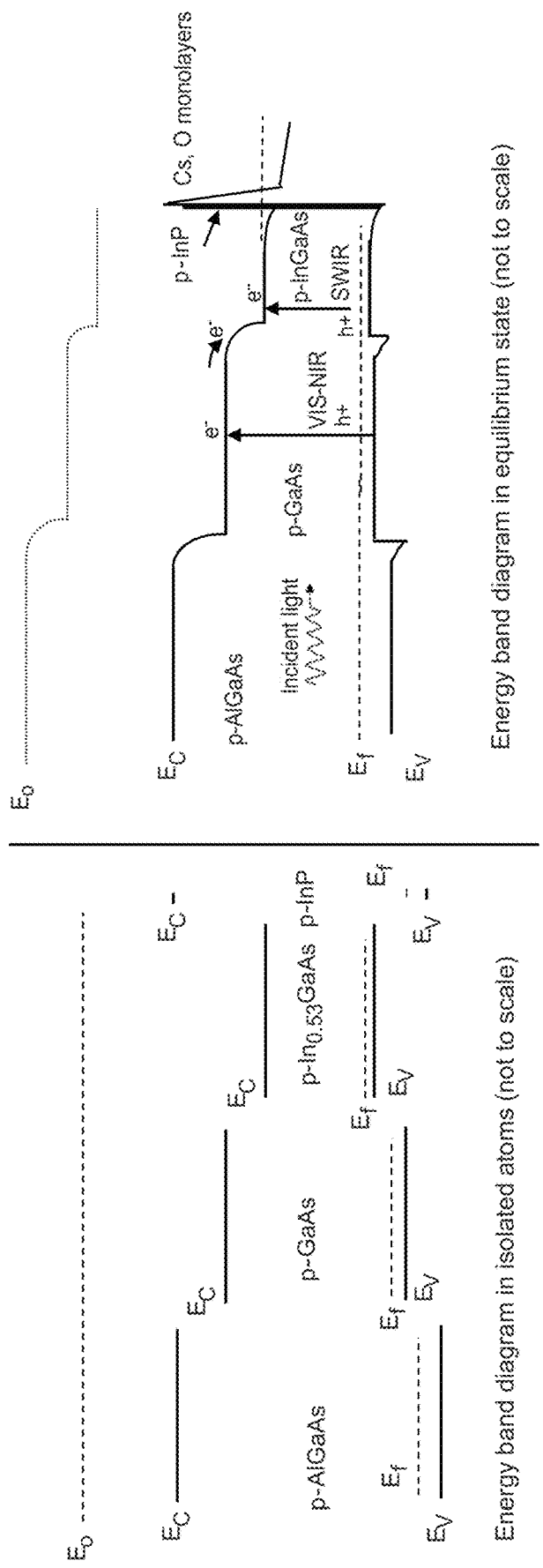
FIG. 11 is an energy band diagram showing isolated layers (not to scale) and assembled layers in an equilibrium state (not to scale)

FIG. 11 is a split band energy diagram showing an energy band in isolated atoms (left side) (not to scale) and an energy band in equilibrium state (right side) (not to scale). The optical properties of the semiconductors are defined via energy bands of each layer in the structure. $E_c$ is the conduction-band, and $E_v$ is the valance-band that together define an energy level for each layer of the structure. The difference between $E_c$ and $E_v$ is the bandgap for each layer. The bandgap determines which photons can be absorbed.

The layers are selected to align the bandgaps in the manner shown in FIG. 11 (left side) with reducing bandgaps by layer enabling the absorption of low energy photons, which equates to longer wavelengths. The bandwidth of the spectral response for the assembled photocathode 106 may be increased from 0.55 μm (standard Gen III response 0.400 μm-0.95 μm) to 1.25 μm, which can be extended up to 1.7 μm. In some cases, an upper limit of SWIR response can be beyond 2.1 μm. When the layers are joined together, there is some bending of the bandgap and the interface between the layers (right side in FIG. 11). $E_o$ refers to the vacuum level, and $E_f$ refers to the fermi level. The fermi level becomes aligned after assembly as shown on the right side in FIG. 11. The favorable band structure allows the resulting photocathode to diffuse out electrons (created due to interaction of light with the absorber layer) toward the vacuum. The InP barrier layer 146 acts as an activation surface and barrier for thermally generated electrons.

The embodiment illustrated implements standard Cs—O activation. The Cs—O layers enable photons to reach the vacuum by maintaining the conduction band $E_c$ below the vacuum level $E_o$, thereby enabling the electrons (produced upon the incident of photons) to move into the vacuum. The InP barrier layer is designed to be thin enough not to block the electrons reaching the vacuum or overall $E_c$ will be below the $E_o$. That is, electrons created by the SWIR absorber 134 will reach the vacuum due to the built-in electric field at the semiconductor vacuum interface or BBR region. The functionality of the NIR absorber layer remains largely consistent when compared to the traditional GaAs photocathode.

Figure 12:
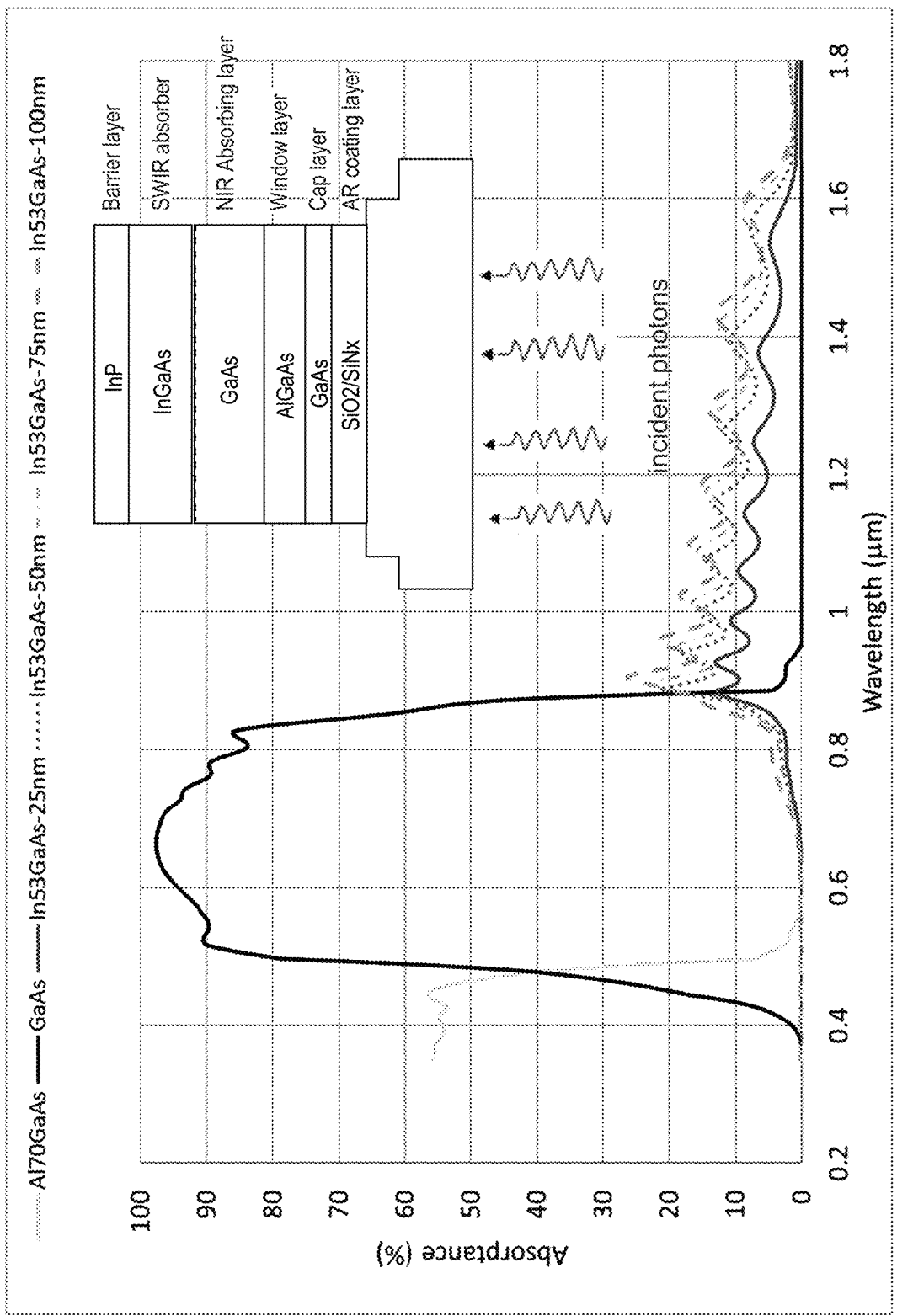
FIG. 12 is a graph illustrating SWIR absorptance as a function of SWIR absorber layer thickness.

FIG. 12 is an absorption model showing the effect of different thicknesses of the SWIR absorber layer 134. The amount of photons that can be absorbed can be calculated as a function of the wavelength showing that different thicknesses absorb different amounts. The model shows variations in the SWIR absorber layer 134 in a range of 25 nm-100 nm, which is considerably thinner than the NIR absorber layer 130. For example, the SWIR absorber layer 134 is typically less than 1/10th the thickness of the NIR absorber layer 130. If the SWIR absorber layer 134 is too thick, it will negatively affect operation of the overall device. Bandwidth is fixed by the bandgap of the InGaAs material. As such, wavelength does not change with different thicknesses of the SWIR absorber layer, but the absorbance can be improved with different thicknesses providing for more efficient detection. The chart shows how variations of the SWIR absorber layer extend the absorbance range of the photocathode.

The wavelength upper range can be tuned from 1.251 μm-1.7 μm by varying the composition of the SWIR absorber layer 134. For example, as described, a high optical quality SWIR absorber layer can be made from InGaAs bulk material, which is lattice matched to the InP substrate, unrestrained or strained InGaAs/InGaAsP quantum well or quantum dot structure. The varying compositions enable wavelength tuning for the resulting structure.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of forming a photocathode, the method comprising:
    (a) assembling a first absorber on a first substrate for a first spectral band;
    (b) assembling a second absorber on a second substrate for a second spectral band, wherein the second substrate is different from the first substrate, and wherein the second spectral band is different from the first spectral band; and
    (c) joining the first absorber and the second absorber using a direct semiconductor wafer bonding process.

2. A method according to claim 1, wherein step (a) is practiced such that the first spectral band comprises a near infrared (NIR) wavelength, and wherein step (b) is practiced such that the second spectral band comprises a short-wave infrared (SWIR) wavelength.

3. A method according to claim 2, wherein the first substrate comprises a GaAs substrate, and wherein step (a) comprises forming a window layer on the first substrate, and forming an NIR absorber layer on the window layer.

4. A method according to claim 2, wherein the second substrate comprises an InP substrate, and wherein step (b) comprises forming an SWIR absorber layer on the second substrate.

5. A method according to claim 4, further comprising tuning the second spectral band by engineering a bandgap of the SWIR absorber layer.

6. A method according to claim 2, wherein step (a) comprises, prior to step (c), forming a first etch stop layer on the first substrate, forming a cap layer on the first etch stop layer, forming a window layer on the cap layer, and forming an NIR absorber layer on the window layer, and
    wherein step (b) comprises, prior to step (c), forming a second etch stop layer on the second substrate, forming a barrier layer on the second etch stop layer, and forming an SWIR absorber layer on the barrier layer.

7. A method according to claim 6, further comprising, after step (c), removing the first substrate and removing the first etch stop layer, thereby exposing the cap layer.

8. A method according to claim 7, further comprising, after the removing steps, forming an anti-reflective (AR) coating layer on the cap layer.

9. A method according to claim 8, further comprising, after forming the AR coating layer, bonding an input faceplate on the AR coating layer.

10. A method according to claim 9, further comprising, after bonding the input faceplate, removing the second substrate and the second etch stop layer.

11. A method according to claim 6, wherein steps (a) and (b) are practiced such that the SWIR absorber layer is thinner than the NIR absorber layer.

12. A method according to claim 1, further comprising, after step (c), removing the first substrate to define an interim construction, bonding the interim construction to an input face plate, and subsequently removing the second substrate.

13. A photocathode formed according to the method of claim 1.

14. A photocathode formed according to the method of claim 2.

15. A method of forming a photocathode, the method comprising:
   growing a first photocathode wafer on a GaAs substrate, the first photocathode wafer initially including a near infrared (NIR) absorber layer along with a first etch stop layer and a window layer;
   growing a second photocathode wafer on an InP substrate, the second photocathode wafer initially including a short-wave infrared (SWIR) absorber layer along with a second etch stop layer and a barrier layer;
   integrating the first and second photocathode wafers via a direct semiconductor wafer bonding process;
   removing the first and second etch stop layers; and
   bonding an input faceplate to the integrated first and second photocathode wafers.

16. A method according to claim 15, wherein the SWIR absorber layer is thinner than the NIR absorber layer.

17. A method according to claim 15, further comprising tuning a spectral band of the photocathode by engineering a bandgap of the SWIR absorber layer.

18. A photocathode formed according to the method of claim 15.

19. A photocathode according to claim 17, wherein a range of SWIR spectral response is 1.25-2.1 μm.

* * * * *

UNITED STATES PATENT AND TRADEMARK OFFICE
CERTIFICATE OF CORRECTION

PATENT NO.      : 12,334,321 B1                             Page 1 of 1
APPLICATION NO. : 18/796351
DATED           : June 17, 2025
INVENTOR(S)     : Bed Pantha It is certified that error appears in the above-identified patent and that said Letters Patent is hereby corrected as shown below:

On the Title Page

Item (54), in the title, before "AND MANUFACTURING" add --DESIGN--.

In the Specification

Column 1, Line 1, in the title, before "AND MANUFACTURING" add --DESIGN--.

Signed and Sealed this
Second Day of September, 2025

Coke Morgan Stewart
*Acting Director of the United States Patent and Trademark Office*